United States Patent [19]
Haga et al.

[11] 3,875,276
[45] Apr. 1, 1975

[54] METHOD FOR CONTINUOUSLY PRODUCING A SYNTHETIC POLYMER FOAMED MASS HAVING SQUARE CROSS SECTION

[75] Inventors: Hisashi Haga, Kobe; Yukio Takamatsu, Akashi, both of Japan

[73] Assignee: Toyo Rubber Industry Company Ltd., Osaka, Japan

[22] Filed: June 28, 1973

[21] Appl. No.: 374,430

Related U.S. Application Data

[62] Division of Ser. No. 240,405, April 3, 1972, Pat. No. 3,768,937.

[52] U.S. Cl. .................... 264/51, 264/47, 264/53, 264/54, 264/55
[51] Int. Cl. ........................................... B23d 27/00
[58] Field of Search .............. 264/51, 54, 47, 53, 55

[56] References Cited
UNITED STATES PATENTS

| | | | |
|---|---|---|---|
| 3,091,811 | 6/1963 | Hackert et al. | 264/48 |
| 3,123,856 | 3/1964 | Dye et al. | 264/47 |
| 3,291,873 | 12/1966 | Eakin | 264/55 |
| 3,354,503 | 11/1967 | Joseph et al. | 264/47 |
| 3,553,300 | 1/1971 | Buff | 264/54 |
| 3,627,860 | 12/1971 | Hagen | 264/51 |
| 3,632,706 | 1/1972 | Müller | 264/55 |
| 3,719,734 | 3/1973 | Petzetakis | 264/54 |
| 3,768,937 | 10/1973 | Haga et al. | 264/47 |

*Primary Examiner*—Melvyn I. Marquis
*Attorney, Agent, or Firm*—Sughrue, Rothwell, Mion, Zinn and Macpeak

[57] ABSTRACT

An apparatus for continuously producing a synthetic polymer foamed mass having square cross sections which comprises a travelling conveyor belt, a channel-shaped continuously extending trough mounted on said belt and moving with the travelling of said belt for filling with a foaming liquid material, the two sidewalls of said trough being lower than the height of a finally foamed mass, adjacent to each of said sidewalls, inside said trough and in the region where foaming of said foaming liquid material begins to occur and is finished a stationary arranged guiding plate nearly flush with or higher than the height of a finally foamed mass, said guiding plate having in the middle portion thereof an oblique upper rim portion of an obliqueness nearly equal to or slightly greater than the rising angle of the foaming material and being formed in a twisted and folded shape, a bag-shaped or elongated tubular film or sheet of an synthetic polymer or resin surrounding each of said guiding plates, said film or sheet being movable along said guiding plate in the same direction as and at an equal speed to the speed and direction of said trough and upwardly along the lateral ends of said foaming material in the area of said oblique upper rim portion of said guiding plate, means fixed to the front end of each of said guiding plates for blowing air or a gas into said film or sheet, and means for cutting the top portion of each of said films or sheets, said means being fixed on the rear end portion of said oblique upper rim portion, is disclosed.

2 Claims, 8 Drawing Figures

METHOD FOR CONTINUOUSLY PRODUCING A SYNTHETIC POLYMER FOAMED MASS HAVING SQUARE CROSS SECTION

CROSS-REFERENCE TO RELATED APPLICATION

This application is a division of application Ser. No. 240,405, filed Apr. 3, 1972 which is now U.S. Pat. No. 3,768,937 granted Oct. 30, 1973 entitled "Apparatus for Continuously Producing a Synthetic Polymer Foamed Mass Having Square Cross Section."

BACKGROUND OF THE INVENTION

1. Field of the Invention

This invention relates to an apparatus and a method for continuously producing a synthetic polymer foamed mass having completely square cross-sections or a flat upper surface.

In this specification, the term "foamed mass" is intended to signify a porous mass or a slab foam molded or shaped from a foaming liquid material. The term "square" or "completely square" is intended to cover a tetragon of which each side is straight and is at right angles to each other.

2. Description of the Prior Art

The known methods for manufacturing a molded foam continuously comprise, in general, jet-spraying, casting or pouring a foaming liquid material, through nozzles, into a channel-shaped or box-shaped, continuously extending trough, as a mold, made of a synthetic resin or a wax coated paper which is mounted on a conveyor belt travelling along at a definite speed and subsequently heating the foamable liquid material to cause the material to foam by the action of a blowing agent where the foaming liquid material contains a blowing agent or to perform foaming by a chemical reaction of the liquid material in the trough, thereby producing continuously a molded foam in a trough mold. The foaming process in the channel-shaped, continuously extending trough, however, gives rise to slow expansion of the foaming liquid material close and parallel to the two sidewalls of the trough (i.e., at the vertical limits of the mold space in the trough) due to the friction between the foaming liquid material and the sidewalls of the trough. This consequently results in the production of a finally molded foam in which the height of the lateral faces is lower than the mean height of the foam. Thus, the prior art methods have a serious disadvantage in that it is difficult or impossible to manufacture continuously a foamed mass having a flat upper surface without impairing the characteristics of the foam article.

Many attempts have been hitherto made to produce a molded foam having a flat upper surface, by positively raising (or aiding the rising of) the foaming material adjacent the vertical limits of the mold space of the trough during foaming using any means which rises with the foam, positioned close to and parallel to the both sidewalls of the trough, for example, (1) narrow long bands moving in a parallel obliqueness to a foaming material rising with the advancement thereof, (2) sheets or panels sliding up gradually with a rising foam in a batch system, (3) outside inclined sidewalls of the trough standing vertically with a rising foam, or (4) a combination of guiding plates and moving paper strips, or rotatable discs, which are positioned in the trough, particularly in the region where foaming first begins to occur and finally ends. These methods using means (1), (2), and (3) above are disclosed in Japanese published specifications Nos. 17669/1966, 15706/1968 and 6551/1968, respectively. Method (4) above is disclosed in U.S Pat. No. 3,091,811, wherein each guiding plate is stationarily positioned, and the paper folded in two is moved horizontally along and around the plate and then moved upwardly along a sharp angle at the rear end of the plate.

However, with such attempt to render the upper surface of a molded foam even or flat, a foam having cracks or creases tends to be produced even if the foam has a flat upper face, or a foam with a completely flat upper surface is not satisfactorily obtained.

The proportion with which both the lateral faces of the finally foamed mass are lower in height ranges of 20 to 25% of the total mass and as a result this leads to the occurence of considerable material loss when a foamed mass with a flat upper surface is provided.

This invention has, therefore, an object to eliminate the above-described disadvantages or drawbacks in the continuous production of a foamed mass having a flat upper surface, and to provide a method and apparatus for manufacturing a foamed mass continuously in which the lowering of both the lateral faces of the foamed mass is completely avoided and the danger of cracks or creases in the foamed mass does not occur.

It is a further object of this invention to provide a method and apparatus for manufacturing continuously a foamed mass having a flat upper surface or a square cross-section with no cracks or creases, which can be smoothly, easily and successfully performed and utilized.

Other objects of this invention will be obvious from the contents of the specification hereinafter disclosed.

SUMMARY OF THE INVENTION

The above objects of this invention can be obtained by using the method of this invention for continuous production of a foamed mass which comprises filling a mold space with a foaming liquid material by continuously supplying a foaming liquid material into a mold comprising a channel-shaped, continuously extending trough in which both of the sidewalls of the continuously extending trough are lower than the height of the finally foamed mass. The continuously extending trough is mounted on a travelling conveyor belt and is moved horizontally together with the advancement of the conveyor belt, and is provided with guiding members for the guidance of the foaming liquid material both in the horizontal direction and in the vertical rising direction. These guiding members comprise guiding plates and having therearound elongated tubular shaped films or sheets of a synthetic polymer or resin at a position and are adjacent to and parallel to both the outer sidewalls of the trough and in the region where foaming begins to occur and is finished. The guiding plates each have an oblique upper rim portion with an obliqueness substantially equal to or slightly greater than the rising foam angle of the foaming material, which are higher than or nearly flush with the height of the finally foamed mass and which are stationarily positioned adjacent the outer sidewall of the trough. The elongated tubular films or sheets surround the guiding plates therein. The films or sheets are independently moved along the guiding plates horizontally and upwardly at an equal speed to and in the same direction as those of the trough during foaming, and after completion of foaming, are horizontally moved. With the advancement of the films or sheets, the foaming and rising material portions adjacent the vertical limits of the mold space close to the sidewalls (the lateral end portions of the foaming material) are, accordingly, moved upwardly and the foaming material in the trough mold is, totally moved upwardly at a rate equal to the level of its surface. A finally foamed mass having completely square cross-sections can be thus obtained.

Another feature of the invention is to provide an apparatus adapted to carry out the method according to this invention. In accordance with the invention, the apparatus for continuously manufacturing a foamed mass having square cross-sections or a flat upper surface comprises: a channel-shaped, continuously extending trough, with both sidewalls lower than the height of the finally foamed mass, which is mounted on a travelling conveyor belt and horizontally moved together with the conveyance of the conveyor belt and guiding members for the guidance of a foaming liquid material continuously supplied in the trough both in the horizontal direction to the advancing direction of the trough and in the vertical rising direction of the foam. The guiding members comprise guiding plates as specified hereinafter and elongated tubular films or sheets made of a synthetic polymer, which guiding members are arranged adjacent and parallel to both the outer sidewalls of the trough nearly in the region where foaming begins to occur and is finished, the guiding plates each having an oblique upper rim portion of an obliqueness nearly equal to or a little greater than the rising angle of the foaming material, being nearly flush with or higher than the height of the finally foamed mass and being positioned stationarily adjacent the outer sidewall of the trough. Surrounding these guiding plates are continuous tubular shaped films or sheets with these films or sheets being advanced horizontally and independently along each of the guiding plates at an equal speed to and in the same direction as those of the trough.

More particularly, in accordance with the invention there is provided an apparatus in which the guiding members are further characterized as comprising guiding plates each of which is shaped in a twisted and folded form and has the oblique upper rim portion as described above in its middle portion and elongated tubular shaped (endless tubular shaped) films of sheets surrounding or covering said guiding plate with the film surrounding each plate being moved at an equal speed to and in the same direction as the speed and direction of the trough, wherein the film or sheet makes a twisting movement in the region from the fold portion to the obliques portion of the guiding plate and then is moved upwardly along the said obliqueness, so that, as the part of the film or sheet moving along the bottom portion of the guiding plate near the beginning of the guiding plate is reversed in orientation with that part of the film or sheet after passing the twisted area moves along the top portion of the guiding plate and is moved horizontally and upwardly, during foaming, corresponding to the rising speed of the foaming material, the lateral ends of the foaming material contacted with the film being moved upwardly to result in a foamed mass having completely square cross-section. After the tubular shaped film or sheet completes its movement past the upwardly rising portion of the guiding plate and begins to move in a substantially horizontal direction, the top of the elongated tubular shaped film or sheet is slit or cut to form a U-shaped film or sheet into which an amount of water is sprayed or dropped to cool the film or sheet and counteract the softening of the film which is warmed by contact with the foam during foaming and to minimize the generation of static electricity in the film.

BRIEF DESCRIPTION OF THE ACCOMPANYING DRAWINGS

The invention will be further explained by reference to the accompaning drawings which show an embodiment for carrying out the method according to the invention in which.

DESCRIPTION OF PREFERRED EMBODIMENTS

Now referring to FIG. 1 to FIG. 6, one embodiment of the invention will be illustrated in greater detail hereinbelow.

Figure 1:
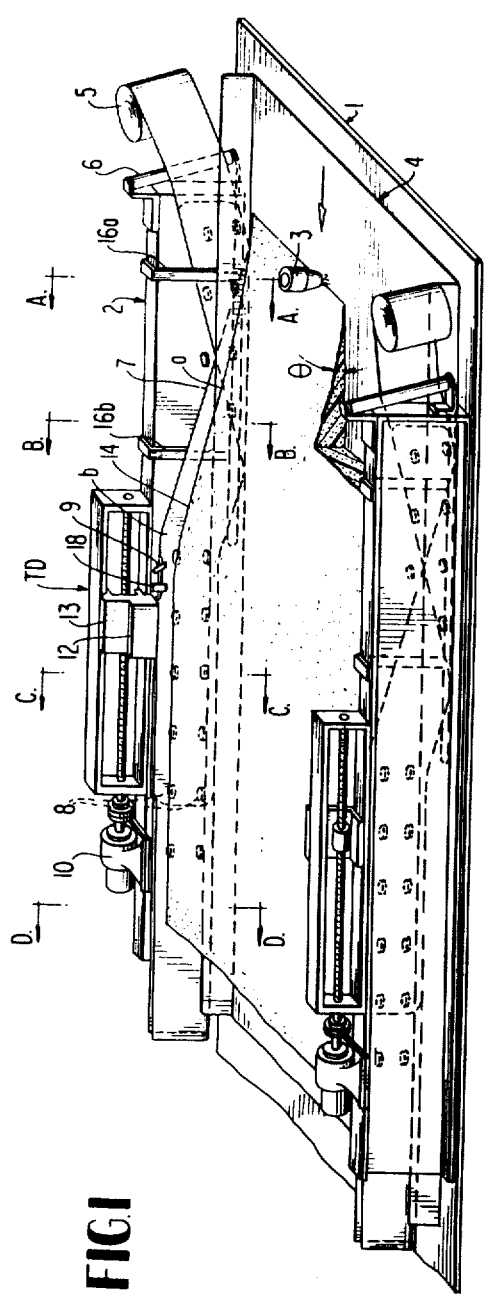
FIG. 1, is a perspective view of one embodiment according to the invention.

In FIG. 1, a conveyor belt 1 which is travelled in the direction indicated by the arrow mark during the foaming process has two side frames 2 fixed in a parallel relation on both ends thereof and at a slight distance from the surface, which frames are constituted of, in general, duralumin, aluminium or iron sheet. On the surface of the conveyor belt 1 a channel-shaped, continuously extending trough 4 is arranged so that its sidewalls are inside and close to the side frames 2 and is adapted to be moved horizontally at an equal speed to that of the conveyor belt 1. Suitable materials for the trough 4, for example, are a wax or synthetic resin treated paper. Both sidewalls of the trough 4 have a lower height than, more preferably one half to one fifth the height of, the finally foamed mass 15.

Figure 2:
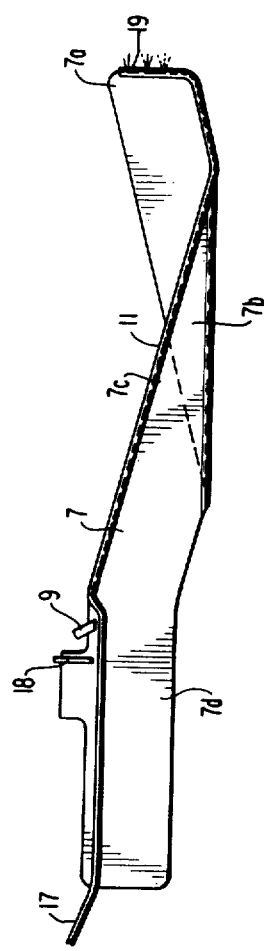
FIG. 2, is an enlarged front view of the guiding plate shown in FIG. 1.
Figure 8:
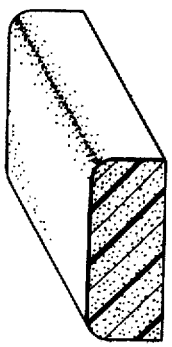
FIG. 8, is a perspective view showing one examples of article shapes obtained according to the prior art techniques.

Each guiding member comprises a guiding plate 7 shaped with an oblique upper rim having an obliquness nearly equal to or slightly greater than the rising angle ($\theta$) of a foaming material 14 and an elongated tubular film or sheet made of a synthetic polymer or resin 5 is inserted around the guiding plate between the sidewall of the trough 4 and the fixed side frame 2 in the region where foaming begins to occur and is completed, the position of insertion being adaptable to an optional place by a traversing device TD, and thus, the two guiding members are positioned each in parallel relation and close to the outer sidewalls of the trough 4. The guiding plate 7 having an oblique upper rim of an obliqueness nearly equal to or a little greater than the rising angle ($\theta$) of the foaming material is shaped and comprises, as shown in FIG. 2, a front oblique portion 7a, a twisted and folded portion 7b, middle oblique portion 7c and a horizontal portion 7d. The twisted and folded portion 7b is obtained by reversely bending the elongated guide plate about an oblique transverse line so that the front oblique portion 7a and the middle oblique portion 7c will be in parallel planes. The middle oblique portion 7c is so formed that it has an obliqueness nearly equal to or greater than the rising foam angle ($\theta$) and accordingly, the front oblique portion 7a has a reverse, symmetrical obliqueness to the middle portion 7c. Orifices 19 are positioned around the upper periphery of the guiding plates at the beginning of the guiding plate 7a where the elongated tubular shaped bag or film 5 is unrolled and inserted around and over the guiding plate through which air or any gas can be blown to expand the elongated tubular shaped bag or film and permit easier insertion, to facilitate the smooth advancement and forwarding of the endless tubular shaped bag or film along guiding plate 7 without clinging, to minimize creasing of the bag or film and to provide a slight pressure by the bag or film against the side wall of the foam due to the air pressure provided inside the bag or film. These orifices can be provided by an air or gas pipe 11 connected by pipe 17 to a source of air (not shown). The lower horizontal portion of the portion 7b of plate 7 is positioned at a slight interval on the conveyer belt 1. The guiding plate 7 can be selected appropriately from among the light-weight, non-ferrous metals, non-ferrous alloys, thin steels, synthetic resins and wood panels. Preferably the guiding plate 7 and the pipes 11 and 17 are surface-coated with a synthetic polymer pellicle of low friction resistance and good slipperiness, such as a fluorocarbon resin. The guiding plate 7 is provided with a blade knife 9 mounted on the upper rim thereof at the border between the horizontal portion 7d and the middle obliqueness portion 7c. The knife 9 is to cut open the upper endless rim of the bag-shaped film or sheet 5 at the position where foaming is finished. Preferably, after cutting the bag or film an appropriate amount of water is applied to the film from the water outlet 18 between the film space. The thus cut-open film in its upper rim is moved away horizontally together with the foamed mass at a mutually identical speed and is wound up on a roll.

The bag-shaped, elongated film or sheet 5 is moved horizontally in the same direction as and at a speed equal that to of the trough 4 while guiding plate 7 is inserted therein in such a manner that the film is moved downwardly between the plate at the front portion 7a where a foaming liquid material is supplied continuously in the trough mold. The direction of the film or sheet 5 is upwardly along the obliqueness of the guide plate at the middle portion 7c which has an obliqueness nearly equal to or slightly greater than the angle of the rising foam, formed as foaming proceeds, and reaches the knife or cutter 9 at the horizontal portion 7d of the front part of guide plate where the foaming is completed. The rising of the foaming material is shown in a portion a–b of the initial foam 14. The film is cut open along its upper rim with knife 9 and moved horizontally along the horizontal portion 7d, and finally moved away with the finally foamed mass at the mutually same speed. As the sheet or film material, a synthetic polymer, such as polystyrene, polyethylene, polypropylene, polyvinyl chloride and the like may be preferably used, but those sheet or film materials treated with a resin or a non-adhesive material may also be used. Thus, each film or sheet 5 is moved upwardly and horizontally along the obliqueness of the guiding plate 7 nearly equal to the rising foam angle ($\theta$) during foaming, so that the lateral ends of the foaming material close to the film or sheet in the vertical limits of the mold space are moved upwardly in conformity with the advancement of the film with no friction resistance during foaming and a foamed mass 15 having completely square cross-section results.

The finally foamed mass is then moved away horizontally and withdrawn from the apparatus.

A pair of guide rolls 6 is positioned near the front end of each of the side frames 2 to facilitate the horizontal advancement of the film 5. Further, a plurality of rollers 8 are provided at random or in a regular manner on a part adjacent the guiding plate of the inner side frame 2 and constructed using a swinging mechanism in order to prevent the guiding plate 7 from pressing the film or sheet 5 onto the side frame 2 due to a foaming pressure and resulting in hindering the film or sheet 5 from advancing smoothly and horizontally.

Since the rising foam angle ($\theta$) of the initial foam formed 14 and the region where foaming begins to occur and is finished vary depending upon the nature and type of foaming liquid material used, each guiding plate 7 is arranged stationarily at an optional, optimal position using traversing device TD, which is fixed on the frame 2 of the conveyor belt 1 through a fixing bolt 12. Traversing device TD comprises a traverser 13 which is capable of being shifted to a suitable optional place by means of a screw joined through a coupling with a motor 10 and thus is, capable of arranging the guiding plate 7 at an optimal position in the horizontal direction.

A jet nozzle 3 is used to supply or pour a foaming liquid material into the trough 4 while it is reciprocated across the width of the conveyor belt 1.

Two press or supporting bars 16a and 16b are mounted astride the side frame 2 so as to be positioned at the front obliqueness portion 7a and the middle obliqueness portion 7c of the guiding plate 7, respectively in order to prevent the bag-shaped elongated tubular shaped film 5 guided through the pair of the guiding rolls 6 from bulging, i.e., separating or deviating from the guiding plate therein. The press bars are preferably surface-coated with a synthetic resin pellicle of a low friction resistance. A plurality of rollers 8 are provided for receiving the side face of the guiding plate 7 on the side frame 2 in order to prevent the plate from being pressed onto the side frame due to the foaming pressure generated and thus, hindering the film or sheet surrounding the plate from advancement.

The foaming process by the use of the apparatus described above according to the invention is illustrated, for example in FIG. 3, FIG. 4, FIG. 5 and FIG. 6 more specifically.

Figure 3:
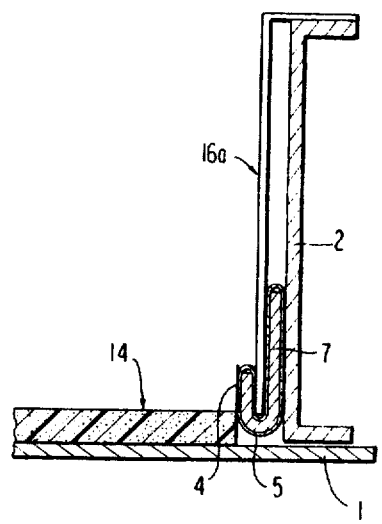
FIG. 3, FIG. 4, FIG. 5 and FIG. 6 are enlarged cross-sectional views in the cross-sections A—A, B—B, C—C, and D—D in FIG. 1 respectively, each showing the foaming process condition sequentially using the guiding member of FIG. 1.
Figure 4:
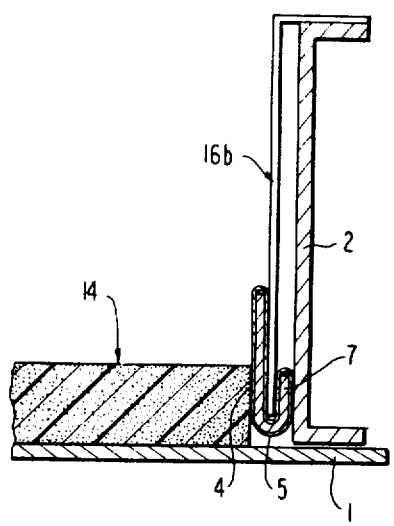
Figure 5:
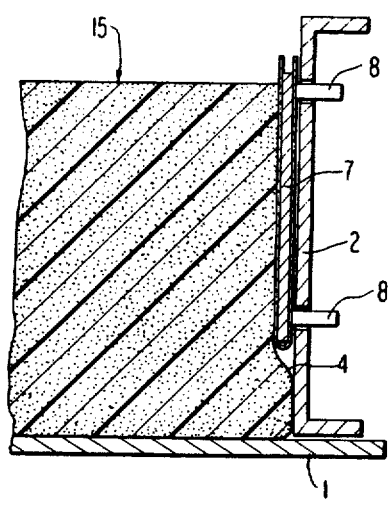
Figure 6:
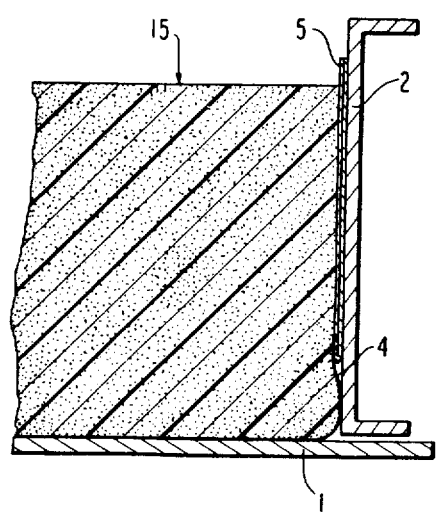

A foaming liquid material such as a polyurethane foaming material is poured continuously and homogeneously through the reciprocating nozzle 3 into the trough 4 mounted on the conveyor belt 1 which is conveyed horizontally in the direction of the arrow mark in FIG. 1. At the same time, the tubular shaped sheet 5 passing through a pair of the guide rolls 6 is horizontally introduced around the guiding plate at the same speed as that of the trough downwardly for insertion around the front obliqueness portion 7a while being pressed with the supporting bar 16a (FIG. 3). The sheet 5 further is moved and bent upwardly along the folded portion 7b and then moved into the middle obliqueness portion 7c along this portion and upwardly while being pressed with the supporting bar 16b (FIG. 4), during which time foaming begins to occur and gradually proceeds. (see a in FIG. 1). Here, the foaming material during the foaming process is guided along the obliqueness of the guiding plate which is nearly equal to the rising angle (θ) of the foaming material 14, so that the lateral ends thereof adjacent the advancing film are moved upwardly to finally produce a foamed mass having an even upper surface. When the foaming process is nearly finished to result in a foamed mass (see b in FIG. 1), the sheet 5 is moved past knife 9 where the top rim is cut open and cooling water applied thereto. The cut film or sheet 5 further proceeds horizontally along the horizontal portion 7d of the plate (FIG. 5). The completely foamed mass 15 is further conveyed along the film passing through the horizontal portion 7d (FIG. 6) and is removed.

Figure 7:
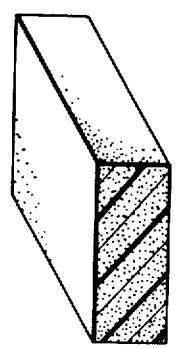
FIG. 7, is a perspective view showing an article shape obtained according to one embodiment of the invention.

Thus, a foamed mass having a flat upper surface or completely square cross-sections 15 is obtained continuously as shown in FIG. 7.

It is to be understood that the above description discloses preferred embodiments illustrated by the drawings according to the invention and the various modifications and changes may be made without departing from the spirit and scope of the invention as described herein.

According to the invention, many advantages are attained in that material loss of the foamed mass is eliminated and the utility is remarkably increased since a foam having a square cross-section shape is satisfactorily formed. The process of the continuous production is particularly suitable for large scale industrial production since the foaming process is preformed continuously and automatically. As a result, a synthetic polymer foamed mass having square cross-sections is produced with a uniform shape and uniform quality and a synthetic polymer foam having cross-sections is foamed without cracks or creases since the foaming material is smoothly and successively guided and foamed at an even level using the guiding member as specified.

What is claimed is:

1. A method of continuously producing a synthetic polymer foamed mass having square cross sections which comprises supplying a foaming liquid material continuously in a channel-shaped, continuously extending trough, as a mold, mounted on a conveyor belt and travelling with said conveyor belt, said trough having side walls lower than the height of a finally foamed mass, and simultaneously moving tubular elongated films of a synthetic polymer or resin surrounding guiding plates adjacent each of said sidewalls, said guiding plates being reversely bent about an oblique transverse line to provide a twisted and folded shape and being nearly flush with or higher than the height of a finally foamed mass and having in the middle thereof as oblique upper rim portion of an obliqueness equal to or slightly greater than the angle of the rising foaming material in the region where foaming of said material begins to occur and is finished, whereby the foaming material is conveyed in conformity with the movement of said films with the lateral ends of the rising foaming material adjacent said films in the area of foaming being moved upwardly with the advancement of said films.

2. The method as claimed in claim 1, wherein said foaming liquid material is finished foaming at a position near the rear ends of said oblique upper rim portions of said guiding plates, and wherein additionally said films are cut open along the top thereof and water in an amount sufficient to cool said films is applied to said films.

* * * * *